United States Patent [19]

Litterini

[11] 4,408,649

[45] Oct. 11, 1983

[54] TIRE REPAIR UNIT

[75] Inventor: Donald E. Litterini, Johnstown, Ohio

[73] Assignee: Technical Rubber Company, Inc., Johnstown, Ohio

[21] Appl. No.: 340,404

[22] Filed: Jan. 18, 1982

Related U.S. Application Data

[63] Continuation of Ser. No. 166,024, Jul. 7, 1980, abandoned.

[51] Int. Cl.³ ............................................. B60C 21/00
[52] U.S. Cl. ..................................... 152/367; 138/98; 156/97
[58] Field of Search ....................... 152/367, 370, 371; 156/97; 138/98, 99

[56] References Cited

U.S. PATENT DOCUMENTS

| | | | |
|---|---|---|---|
| 1,608,234 | 11/1926 | Reeve | 152/367 |
| 1,968,606 | 7/1934 | Knapton | 152/367 |
| 2,852,058 | 9/1958 | Chambers et al. | 152/367 |
| 3,004,580 | 10/1961 | Chambers et al. | 152/367 |
| 3,036,620 | 5/1962 | Chambers et al. | 152/367 |

Primary Examiner—William A. Powell
Assistant Examiner—Thomas Bokan
Attorney, Agent, or Firm—Robert E. Stebens

[57] ABSTRACT

A tire repair unit is provided having a plurality of rubberized cord plies which are of a generally circular configuration and are of different area sizes. The several plies are assembled in stacked, superposed relationship but with the plies being of progressively larger area with respect to the smallest area ply designed to be positioned next adjacent the interior surface of a pneumatic tire casing to be repaired. The plies are relatively oriented with a peripheral marginal edge portion of the larger plies projecting a predetermined distance laterally outward with respect to the peripheral edge of the next adjacent ply. A layer of unvulcanized rubber is disposed in overlying relationship to the rubberized cord plies and is disposed next adjacent the smallest area ply. The rubberized cord plies may be unvulcanized or they may be vulcanized as a unit.

11 Claims, 4 Drawing Figures

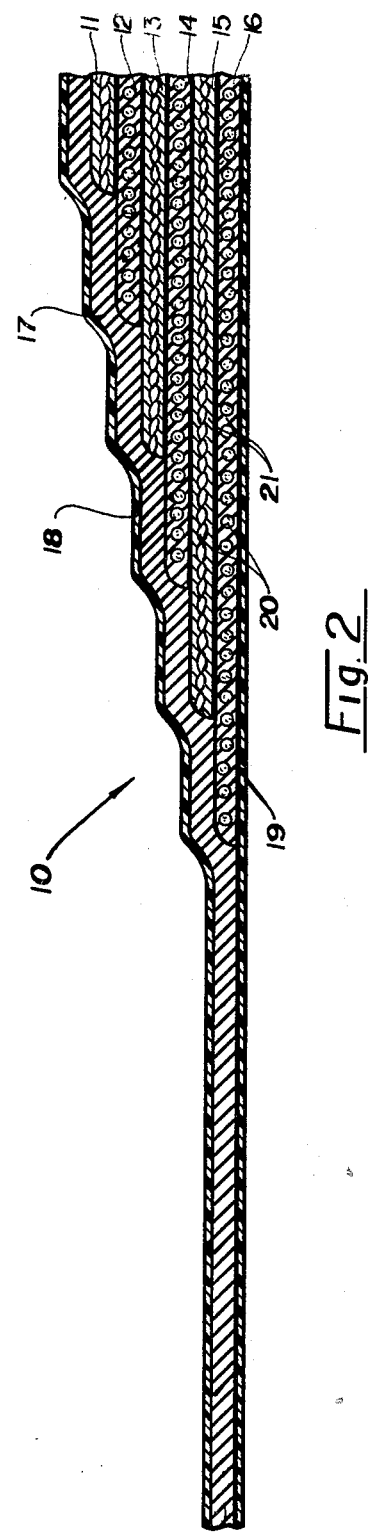

TIRE REPAIR UNIT

This application is a continuation, of application Ser. No. 166,024, filed July 7, 1980 now abandoned.

BACKGROUND OF THE INVENTION

This invention relates to a repair unit for use in the repair of injuries to vehicle tires of either the tube or tubeless type. More particularly, it is designed for reinforcing damaged pneumatic tire casings in which the injury may be of relatively large size thus requiring a repair unit which will cover a relatively large section of the surface area on the interior of the tire surrounding the injury.

Tire repair units of this general type comprising a plurality of rubberized cord plies have been heretofore designed for this specific repair function. Examples of such previously known repair units are disclosed in U.S. Pat. Nos. 2,852,058 issued Sept. 16, 1958 to F. H. Chambers, et al; 3,004,580 issued Oct. 17, 1961 to F. H. Chambers, et al and 3,036,620 issued May 29, 1962 to F. H. Chambers, et al. Each of these patents illustrates various configurations and constructions employed in the fabrication of such multi-ply tire repair units. In general, these prior art repair unit constructions employ a plurality of strips of the rubberized cord plies that are oriented in essentially a 90° angular relationship to each other. Each of the plies comprises a plurality of fibrous cords that are arranged in parallel relationship to each other and formed into a single layer that is embedded into a rubber matrix. Usually, the rubber matrix is vulcanized and a layer of uncured rubber without any reinforcing cords is placed over the entire general surface of the repair unit. Thus, when the tire repair unit is applied to the interior surface of a pneumatic tire casing, the uncured rubber is placed adjacent the tire casing and on application of heat, it is also cured and serves to bond the rubberized cord plies to the tire casing.

One distinctive constructional feature that is characteristic of these prior art tire repair units is that each of the plies is of a generally rectangular shape with all of the cords in a particular ply being of the same length. Thus a tire repair unit, as applied to a casing, will have the several plies oriented so as to align with the cords in the tire casing, and presents a generally cross shaped configuration as between the several plies. Generally, the lengths of each ply are substantially greater than their widths and thus there are relatively long tab portions that extend, or project, a distance laterally with respect to the next adjacent or crosswise oriented ply.

A difficulty encountered with such tire repair unit constructions is that the endmost portions tend to first develop cracks in the rubberized plies as between the cords embedded therein and results in separation of the plies from the tire casing. This problem was recognized and thus the structure shown in U.S. Pat. No. 3,004,580 was developed and considered an improvement over the structure of a basic tire repair unit of this type as shown in U.S. Pat. No. 3,036,620. The improvement in U.S. Pat. No. 3,004,580 was the application of a strip of fabric having filaments extending in relatively crossed relationship and applied to the terminal end portions of each of the plies. This added fabric strip was positioned to extend a distance outwardly from the end of a cord ply and this outward extending portion would thus be bonded by the underlying cushion layer of rubber to the tire casing during the vulcanizing process. This fabric strip tended to reduce the likelihood that there would be breaking and separation of the rubber matrix between the respective cords in a ply and thereby prevent the ply from pulling away from and separating from the tire casing.

SUMMARY OF THE INVENTION

The tire repair unit of this invention represents a further improvement in the construction of such repair units that has substantially enhanced resistance to separation of the rubberized cord plies from the pneumatic tire casing. The basic illustrative embodiment of the invention which achieves this objective is an assembly of a plurality of rubberized cord plies that are of a generally circular configuration and which may be either vulcanized or remain unvulcanized until time of use. The ply which is designed to be placed next adjacent to the tire casing, has the smallest circular area and each successive superimposed ply has a progressively greater area. The plies are generally coaxially oriented and thus each of the successive plies overlaps and extends a distance outwardly with respect to the circumferential edge of the next underlying ply. A layer of unvulcanized rubber and without any fibrous cords embedded therein, is formed onto the one surface of the assembled plies so as to be positioned against the surface of a pneumatic tire casing during a repair operation and through the application of heat will be vulcanized concurrently with the unvulcanized rubberized cord plies or will vulcanize with and form a bond for the tire repair units fabricated with vulcanized rubberized cord plies.

Each of the respective rubberized cord plies is formed with a layer of parallel extending cords which provide the reinforcing necessary to substantially reestablish the structural integrity of the pneumatic tire casing. It is the function of the rubber to bond and secure those cords in the desired oriented relationship to the tire casing and form a generally smooth-surface repair on the interior of the casing. For the repair of pneumatic tires embodying the biased ply construction, the alternate layers of the rubber cord plies are angularly oriented to each other so that alternate plies will have the cords thereof alignable with a respective biased ply of the tire casing. This arrangement in the conventional tire constructions heretofore employed results in alternate repair unit plies being oriented in a generally 90° relationship. For a radial tire construction, a tire repair unit therefore would have the alternate layers of the rubberized cord plies aligned with the cords in parallel relationship. This would result in either case of the repair unit having the cords oriented to properly align with the reinforcing cords in the pneumatic tire casing.

The advantage and objective obtained with this particular construction of the tire repair unit is the greater ability of the unit to resist separation of the reinforcing cords from the tire casing. This advantage derives in part from the relative shortening of the cords in proportional relationship to their lateral positioning with respect to a longitudinal center axis of the repair unit. The longest cords are provided to be positioned in direct overlying relationship to the injury, so as to extend over a substantially large surface area and better distribute the stress that is developed as a consequence of the injury to the tire casing itself for absorbing and dissipating the energy during its use. The progressive decrease in length of the cords with respect to this centered area results in those cords being subjected to an elongation that is in accordance with proportionally decreased stress that is encountered as those cords are located in a more relatively remote relationship to the area of the injury. The ultimate effect of this construction is that there is a substantially reduced tendency for the cords to separate from each other in their respective plies and from the tire casing as there is a lesser difference in the extent that the respective cords are subjected to elongation. In effect, with the generally circular configuration the terminal end portions of these cords are subjected to an extension, as a consequence of the stress forces developed, that is of the same general proportion as that of the next adjacent cord portion. This is opposite to the square construction heretofore employed wherein the relative stress in each cord decreased in remote displacement to the area of the injury but the lengths were such that there was a substantial difference in the elongations experienced at the terminal end portions.

These and other objects and advantages of this invention will be readily apparent from the following detailed description of an illustrative embodiment thereof and from the accompanying drawings.

DESCRIPTION OF THE DRAWING FIGURES

FIG. 2 is a fragmentary vertical sectional view on an enlarged scale taken along line 2—2 of FIG. 1.

DESCRIPTION OF THE ILLUSTRATIVE EMBODIMENT

Figure 1:
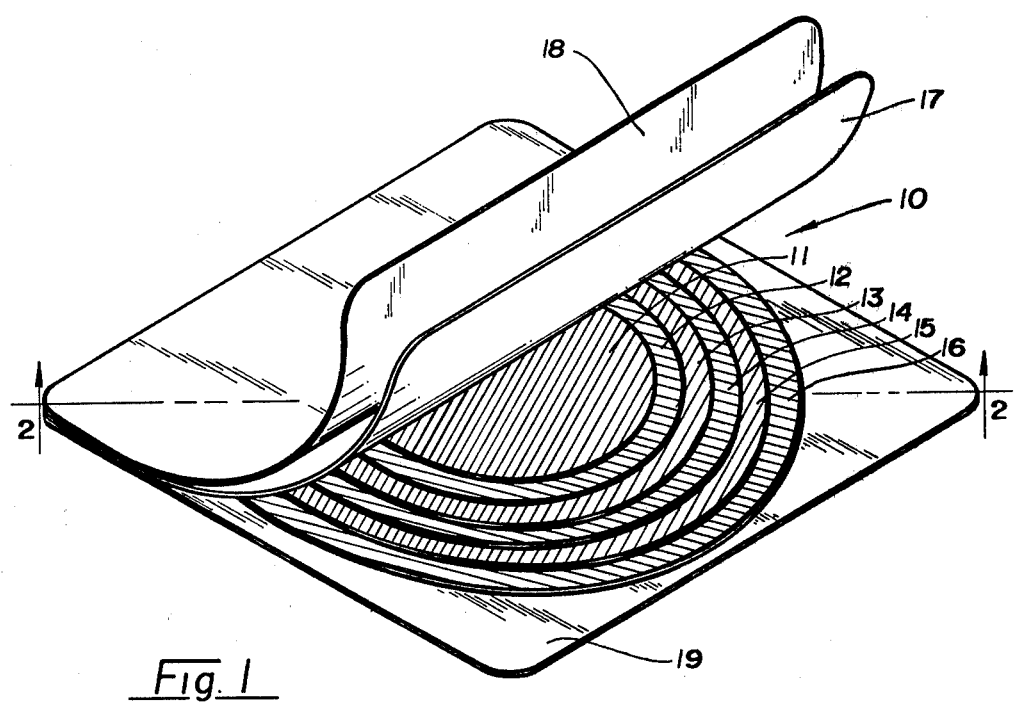
FIG. 1 is a perspective view of a tire repair unit embodying this invention with portions of the respective layers thereof separated and partially sectioned for clarity of illustration.
Figure 3:
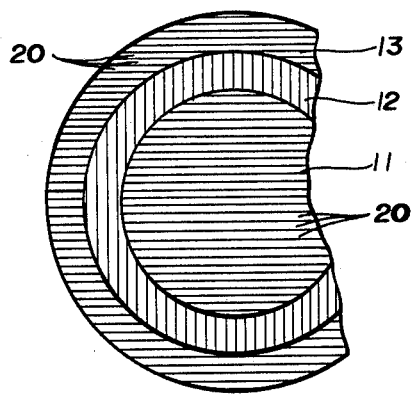
FIG. 3 is a fragmentary plan view of several of the superimposed rubberized plies.

Referring to the drawings, there is illustrated in FIGS. 1 and 2 a tire repair unit designated generally by the numeral 10 and which embodies this invention. This unit comprises a plurality of rubberized cord plies which are sequentially identified by the numerals 11–16. These plies are arranged in a superposed stacked relationship and are covered with an overlying layer 17 of unreinforced rubber. Additionally, for purposes of protection in storage and transport of tire repair units, each of the opposed surfaces is covered by a respective protective cover sheet 18 and 19. These cover sheets 18 and 19 may be formed from paper or plastic film and are designed to be removably adhered to the respective surface of the repair unit. Adhesion may be as a consequence of the slight bonding effect that can be obtained from uncured or unvulcanized rubber. This bonding or affinity of a plastic sheet or paper sheet to the uncured rubber is sufficient to retain the sheets in protective relationship to the repair unit. At the time of utilization of the repair unit, these sheets 18 and 19 are removed and discarded, as they do not perform any function with the tire repair unit in effecting a repair of the pneumatic tire casing.

Each of the rubberized cord plies 11–16 embodies the same constructional techniques. Specifically, each of these plies comprises a single layer of a plurality of elongated cords 20 which are disposed in a side by side parallel relationship. This construction is best seen in the fragmentary section view of FIG. 2. A layer of unvulcanized rubber is formed as a matrix 21 in which the cords are embedded. Thus, as can be seen in FIG. 2, each ply is of a predetermined thickness in which the rubber matrix 21 is sufficiently thick as to completely cover the cords at the opposed surfaces. These plies may be either vulcanized as a unit or they may be left in an unvulcanized state until the repair unit is applied to a tire casing in accordance with the known practices.

In accordance with this invention, each of the plies 11–16, is formed with a substantially circular configuration as can be seen in FIG. 1. Each of the plies is dimensioned to have an area which is different from that of any of the other plies in an assembled group. In FIG. 1, the illustrative embodiment comprises six such plies and it will be noted that each of the plies is substantially coaxially oriented with respect to each of the other plies and they are stacked in superposed relationship in the order of their progressive difference in surface areas. Thus, it will be seen that the uppermost ply in FIG. 1, which ply is designated by numeral 11 and is to be positioned next or first adjacent the interior surface of a pneumatic tire casing when the repair unit is applied to the casing, is of the smallest area. Successive plies 12–16 are progressively larger in surface area thereby resulting in a circumferential marginal edge portion projecting a uniform distance laterally outward with respect to the circumferential edge of the next adjacent preceding ply.

Figure 4:
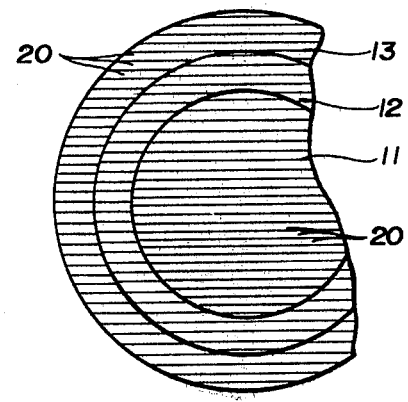
FIG. 4 is a fragmentary plan view of several of the superimposed rubberized plies showing a modified arrangement.

In this illustrative embodiment of a tire repair unit which was designed for use with a biased type pneumatic tire casing, each of the several plies 11–16 are disposed in alternatingly oriented positions. Specifically, the plies are oriented such that each adjacent pair of plies is relatively positioned such that the cords thereof are oriented in a predetermined angular relationship. For a conventional pneumatic tire casing of the bias type, this angular orientation is perpendicular or 90°. This angular orientation of the alternate plies is not deemed a limitation on the scope of the invention as the orientation would be that most appropriate for a particular type of tire casing. For example, in the situation of a radial tire, each of the plies would be oriented such that the cords in each are aligned in parallel relationship. As is well known in the practice of repairing pneumatic tire casings, it is preferred that the cords of the repair unit be aligned with the cords in the tire casing for obtaining the maximum reinforced strength at the location of the injury. Thus, in a bias-type tire, the cords in the alternate layers of the plies are angularly oriented so that there will be cords aligned with the respective cords of the tire casing. The arrangement as to a radial type tire repair unit is shown in fragmentary drawing FIG. 4.

As previously indicated, the several plies 11–16, either in a vulcanized or unvulcanized state when assembled in the illustrated manner of FIG. 1, are covered with an overlying layer of unreinforced rubber 17. This layer is unvulcanized and is placed on the surfaces of the several plies, as shown, so as to cover the exposed circumferential marginal edge portions of each of the plies. Preferably, this layer 17 is of substantially greater area extent than the largest of the plies 16 and may advantageously be of a rectangular shape. In its unvulcanized sheetform state, it is merely applied to the surfaces of the exposed circumferential edge portions of the plies 12–16 and the entire exposed surface of the first ply 11, and is pressed into association therewith. The adhesive bonding properties of the uncured rubber enable the rubber to be retained in secured relationship with the several plies 11–16. When thus assembled, the entire unit is provided with protective cover sheets 18 and 19.

Although the illustrative embodiment is shown as having the several plies 11–16 formed in a circular configuration, it will be apparent that modified configurations may also be adapted. For example, a more oblong or oval shape configuration could also be constructed and result in a tire repair unit having the advantageous features of the previously described and illustrated embodiment. Such a modified unit would also have the several plies formed so that the successive layers, or plies, would have a peripheral or circumferential marginal edge portion projecting laterally outward with respect to the next succeeding ply. Such an arrangement would also be capable of obtaining the advantages of a better and substantially improved resistance to separation at the terminal ends of each ply from the tire casing. The arcuate peripheral edge would result in a proportional decrease in the length of the respective cords in each layer relative to a longitudinal axis and, as a consequence, reduce the elongation and stress effects that are otherwise encountered with a tire repair unit having all of the cords being of the same length.

It will be readily apparent from the foregoing detailed description of the illustrative embodiment of this invention that a particularly novel and improved tire repair unit has been provided. This tire repair unit utilizing the superimposed layers or plies of a circular configuration results in a proper length of the reinforcing cords in each ply to effect a diminishing of the tendency of those cords to separate from a tire casing to which they may be mounted.

Having thus described this invention, what is claimed is:

1. A tire repair unit comprising a plurality of sheet-form, rubberized cord plies assembled in superposed, stacked relationship with opposed surfaces of adjacent plies secured in contacting engagement with each ply having a plurality of cords that are all disposed in parallel relationship to each other and are formed in a planar layer extending substantially across said ply and adjacent plies arranged with the cords thereof oriented in predetermined relationship to each other, each of said plies being of a configuration wherein the cords thereof disposed laterally outward with respect to a central longitudinal axis are of progressively shorter length in proportional relationship to increasing displacement from the longitudinal axis, a first one of said plies being of predetermined size in surface area with each succeeding ply disposed in stacked relationship thereto being progressively larger in surface area with said plies being oriented with respect to each other whereby each ply disposed adjacent a next smaller size ply has a peripheral marginal edge portion extending a distance outwardly of the entire peripheral edge of that next adjacent smaller size ply, and an uncured rubber layer disposed in overlying relationship to the plies assembled in superposed stacked relationship at the side thereof adjacent said first ply, said uncured rubber layer being of a size in area to be at least coextensive with the largest of said plies for direct bonding of all of said first one of said plies and direct bonding of the peripheral marginal edge portion of each of the other of said plies to a tire casing.

2. A tire repair unit according to claim 1 wherein said plies are each of a generally circular configuration.

3. A tire repair unit according to claim 1 or 2 wherein the peripheral marginal edge portion of a ply projecting laterally outward with respect to another ply is of a constant width.

4. A tire repair unit according to claim 1 wherein the adjacent plies are oriented relative to each other in their respective planes to place the cords in each ply in angularly disposed relationship to the cords in the other ply.

5. A tire repair unit according to claim 4 wherein the cords are oriented in perpendicular relationship.

6. A tire repair unit according to claim 1 wherein the adjacent plies are oriented with the respective cords disposed in parallel relationship.

7. A tire repair unit according to claim 1 wherein said plies are unvulcanized when thus assembled in a tire repair unit.

8. A tire repair unit according to claim 1 wherein said uncured rubber layer is of an area size and configuration to extend a distance laterally outward with respect to the peripheral edge of the largest area ply.

9. A tire repair unit according to claim 1 wherein said uncured rubber layer is secured to said plies in bonded relationship.

10. A tire repair unit according to claim 1 wherein said plies are uncured.

11. A tire repair unit according to claim 1 wherein said plies are cured.

* * * * *